(12) United States Patent
Terunuma et al.

(10) Patent No.: US 7,221,546 B2
(45) Date of Patent: May 22, 2007

(54) THIN FILM MAGNETIC HEAD, HEAD GIMBAL ASSEMBLY, AND HARD DISK DRIVE

(75) Inventors: Koichi Terunuma, Tokyo (JP); Koji Shimazawa, Tokyo (JP); Yoshihiro Tsuchiya, Tokyo (JP)

(73) Assignee: TDK Corporation, Tokyo (JP)

( * ) Notice: Subject to any disclaimer, the term of this patent is extended or adjusted under 35 U.S.C. 154(b) by 454 days.

(21) Appl. No.: 10/833,162

(22) Filed: Apr. 28, 2004

(65) Prior Publication Data
US 2005/0018367 A1    Jan. 27, 2005

(30) Foreign Application Priority Data
Jun. 18, 2003  (JP)  ............................. 2003-172916
Mar. 22, 2004  (JP)  ............................. 2004-082437

(51) Int. Cl.
*G11B 5/39*  (2006.01)
*G11B 5/127* (2006.01)

(52) U.S. Cl. ............... 360/324.12; 360/324; 360/324.1; 360/324.11; 29/603.12; 29/603.15

(58) Field of Classification Search ........... 360/324.12, 360/324, 324.1, 324.11
See application file for complete search history.

(56) References Cited

U.S. PATENT DOCUMENTS

| | | | |
|---|---|---|---|
| 6,018,443 A * | 1/2000 | Watanabe et al. ............ 360/319 |
| 6,608,739 B1 * | 8/2003 | Tanaka et al. ......... 360/324.12 |
| 6,697,235 B2 * | 2/2004 | Ohtsu et al. ........... 360/324.12 |
| 6,704,175 B2 * | 3/2004 | Li et al. ................. 360/324.11 |
| 6,721,143 B2 * | 4/2004 | Zheng et al. ............. 360/324.1 |
| 6,937,449 B2 * | 8/2005 | Hoshiya et al. ......... 360/324.12 |
| 2001/0012188 A1 * | 8/2001 | Hasegawa et al. ..... 360/324.12 |

(Continued)

FOREIGN PATENT DOCUMENTS

JP    2001-297412    10/2001

(Continued)

OTHER PUBLICATIONS

U.S. Appl. No. 11/103,563, filed Apr. 12, 2005, Shimazawa et al.

(Continued)

*Primary Examiner*—Wayne Young
*Assistant Examiner*—Matthew G. Kayrish
(74) *Attorney, Agent, or Firm*—Oblon, Spivak, McClelland, Maier & Neustadt, P.C.

(57) ABSTRACT

A longitudinal bias magnetic field control layer applies a counter bias magnetic field to a soft magnetic layer that is antiparallel (in opposite direction) to a longitudinal bias magnetic field. A magnitude of the counter bias magnetic field applied to the soft magnetic layer by the longitudinal bias magnetic field control layer is set smaller than that of the longitudinal bias magnetic field at a track center portion of the soft magnetic layer applied by a pair of bias magnetic field applying layers. A substantial longitudinal bias magnetic field is substantially applied to the soft magnetic layer in the same direction as that of the longitudinal bias magnetic field, and a magnitude of the substantial longitudinal bias magnetic field is maximum at both end portions of the soft magnetic layer and is weakened at the center portion of the soft magnetic layer.

11 Claims, 14 Drawing Sheets

U.S. PATENT DOCUMENTS

| | | | |
|---|---|---|---|
| 2001/0050834 A1* | 12/2001 | Hasegawa et al. | 360/324.12 |
| 2002/0024781 A1* | 2/2002 | Ooshima et al. | 360/324.12 |
| 2002/0071224 A1* | 6/2002 | Tagawa et al. | 360/327.3 |
| 2002/0085323 A1* | 7/2002 | Smith et al. | 360/324.12 |
| 2002/0135953 A1* | 9/2002 | Gill | 360/324.12 |
| 2003/0193761 A1* | 10/2003 | Cornwell et al. | 360/324.12 |
| 2004/0075959 A1* | 4/2004 | Gill | 360/324.12 |
| 2004/0264066 A1 | 12/2004 | Shimizu et al. | |
| 2005/0018367 A1 | 1/2005 | Terunuma et al. | |
| 2005/0099739 A1* | 5/2005 | Chang et al. | 360/324.12 |

FOREIGN PATENT DOCUMENTS

JP     2002-367124     12/2002

OTHER PUBLICATIONS

U.S. Appl. No. 11/105,554, filed Apr. 14, 2005, Shimazawa et al.

* cited by examiner

THIN FILM MAGNETIC HEAD, HEAD GIMBAL ASSEMBLY, AND HARD DISK DRIVE

BACKGROUND OF THE INVENTION

1. Field of the Invention

The present invention relates to a thin film magnetic head comprising a magneto-resistive effect element for reading as a signal a magnetic field strength of a magnetic recording medium or the like, and further relates to a head gimbal assembly and a hard disk drive each including such a thin film magnetic head.

2. Description of the Related Art

In recent years, following improvement in areal recording density of a hard disk drive, improvement in performance of a thin film magnetic head has been required. As the thin film magnetic head, use has been widely made of a composite thin film magnetic head having a structure wherein a reproducing head comprising a read-only magneto-resistive effect element (hereinafter may also be referred to simply as an "MR element"), and a recording head comprising a write-only induction-type electromagnetic transducer element are stacked relative to a substrate.

As the MR element, there can be cited an AMR element using an anisotropic magneto-resistive effect, a GMR element using a giant magneto-resistive effect, a TMR element using a tunnel-type magneto-resistive effect, or the like.

As the GMR element, a spin-valve GMR element has been often used. The spin-valve GMR element comprises a nonmagnetic layer, a soft magnetic layer formed on one surface of the nonmagnetic layer, a ferromagnetic layer formed on the other surface of the nonmagnetic layer, and a pinning layer (generally an antiferromagnetic layer) formed on the ferromagnetic layer on its side apart from the nonmagnetic layer. The soft magnetic layer is a layer that acts to change its magnetization direction depending on a signal magnetic field from the exterior. The ferromagnetic layer is a layer of which a magnetization direction is fixed by a magnetic field from the pinning layer (antiferromagnetic layer).

Large output and small Barkhausen noise are required as characteristics of the reproducing head. Generally, in order to reduce the Barkhausen noise, a bias magnetic field is applied to the MR element in a longitudinal direction (hereinafter, this bias magnetic field will be referred to as a "longitudinal bias magnetic field"). The application of the longitudinal bias magnetic field to the MR element is carried out by, for example, disposing bias magnetic field applying layers each in the form of a permanent magnet, a stacked body of a ferromagnetic layer and an antiferromagnetic layer, or the like on both sides of the MR element.

On the other hand, an increase in recording density in the hard disk drive can be achieved by reduction in track width of the thin film magnetic head, reduction in shield gap length representing a distance between two shield layers disposed on upper and lower sides of the MR element, reduction in thickness of a magnetic recording medium, reduction in size of magnetic particles contained in the magnetic recording medium, and so forth.

Following such an increase in recording density, particularly the reduction in track width, the reproduction track width of a spin-valve magneto-resistive effect film is also narrowed so that the following problem has arisen in terms of a relationship between the soft magnetic layer and the bias magnetic field applying layers.

Specifically, the narrowing of the reproduction track width entails corresponding reduction in length of the soft magnetic layer. Therefore, the bias magnetic field from the bias magnetic field applying layers provided at both ends of the soft magnetic layer becomes too strong so that the soft magnetic layer at a track center portion is inhibited from magnetization rotation, thus causing reduction in reproduction output. On the other hand, if the bias magnetic field is weakened by reducing the thickness of each bias magnetic field applying layer, stability of the magnetic head is lost.

In order to solve such a problem, JP-A-2002-367124 has proposed a magnetic head comprising a spin-valve magneto-resistive effect element having a structure wherein a single-domain forming ferromagnetic layer is formed on a soft magnetic free layer via a nonmagnetic separation layer, and the soft magnetic free layer and the single-domain forming ferromagnetic layer are magnetostatically coupled together at track width ends to form a closed magnetic circuit so that the soft magnetic free layer has magnetization substantially fixed in a direction approximately perpendicular to a magnetic field to be sensed.

However, the proposed magnetic head is insufficient in fixation of the magnetization at both end portions of the soft magnetic free layer and thus can not solve the problem about the stability of the head.

On the other hand, JP-A-2001-297412 has proposed that, in addition to normally performed longitudinal biasing, a stacked bias layer is further formed for ferromagnetic coupling or antiferromagnetic coupling to a soft magnetic layer to stabilize magnetization of the soft magnetic layer. Specifically, in this proposal, since a longitudinal bias magnetic field is weakened at a track center portion of the soft magnetic layer to thereby cause instability of a magnetic head, a bias hard magnetic film is provided on the soft magnetic layer via a nonmagnetic layer to apply a further bias magnetic field to the soft magnetic layer.

Through the ferromagnetic coupling or antiferromagnetic coupling to the soft magnetic layer, the bias hard magnetic film serves to assist the magnetization of the soft magnetic layer caused by the longitudinal bias magnetic field, further in the same direction. Accordingly, the magnetization at both end portions of the soft magnetic layer is sufficiently fixed. However, there arises a problem that the magnetic field at the track center portion of the soft magnetic layer also becomes strong like that at its end portions so that sensitivity at the track center portion decreases to lower the reproduction output.

The present invention has been conceived under these circumstances and has an object to provide a thin film magnetic head that not only ensures stable reproduction performance, but also improves sensitivity of a soft magnetic layer at a track center portion thereof to thereby improve a reproduction output, and has a further object to provide a head gimbal assembly and a hard disk drive each comprising such an improved thin film magnetic head.

SUMMARY OF THE INVENTION

For accomplishing the foregoing object, according to one aspect of the present invention, there is obtained a thin film magnetic head comprising a magneto-resistive effect element having a magneto-resistive effect film, wherein the magneto-resistive effect film is a multilayer film comprising a nonmagnetic layer, a ferromagnetic layer formed on one surface of the nonmagnetic layer, a soft magnetic layer formed on the other surface of the nonmagnetic layer, and a pinning layer formed so as to contact with one surface of the ferromagnetic layer (a surface of the ferromagnetic layer opposite to the other surface thereof contacting with the nonmagnetic layer) for pinning a magnetization direction of the ferromagnetic layer, wherein, at both ends of at least the soft magnetic layer of the magneto-resistive effect film, a pair of bias magnetic field applying layers are disposed for applying a longitudinal bias magnetic field to the soft magnetic layer, wherein a longitudinal bias magnetic field control layer is formed so as to contact with a surface of the soft magnetic layer opposite to the other surface thereof contacting with the nonmagnetic layer, the longitudinal bias magnetic field control layer acting to apply to the soft magnetic layer a counter bias magnetic field that is antiparallel (in opposite direction) to the longitudinal bias magnetic field, and wherein a magnitude of the counter bias magnetic field applied to the soft magnetic layer by the longitudinal bias magnetic field control layer is set smaller than that of the longitudinal bias magnetic field at a track center portion of the soft magnetic layer applied by the pair of bias magnetic field applying layers.

As a preferred mode of the present invention, it is configured such that, through subtraction between the longitudinal bias magnetic field and the counter bias magnetic field, a substantial longitudinal bias magnetic field is substantially applied to the soft magnetic layer in the same direction as that of the longitudinal bias magnetic field, and a magnitude of the substantial longitudinal bias magnetic field is maximum at both end portions of the soft magnetic layer and is weakened at the center portion of the soft magnetic layer.

As a preferred mode of the present invention, it is configured such that the longitudinal bias magnetic field control layer comprises a nonmagnetic intermediate layer and an antiferromagnetic layer, the nonmagnetic intermediate layer disposed so as to contact with the surface of the soft magnetic layer, and that the longitudinal bias magnetic field control layer is exchange-coupled to the soft magnetic layer, and a magnetic field due to exchange coupling therebetween forms the counter bias magnetic field.

As a preferred mode of the present invention, it is configured such that the nonmagnetic intermediate layer contains at least one selected from the group consisting of Cu, Ru, Au, Ir, Rh, and Cr.

As a preferred mode of the present invention, it is configured such that the nonmagnetic intermediate layer has a thickness that enables exchange coupling between the antiferromagnetic layer of the longitudinal bias magnetic field control layer and the soft magnetic layer.

As a preferred mode of the present invention, it is configured such that the longitudinal bias magnetic field control layer comprises a nonmagnetic intermediate layer and a hard magnetic layer, the nonmagnetic intermediate layer disposed so as to contact with the surface of the soft magnetic layer, and that a magnetic field applied to the soft magnetic layer by the hard magnetic layer via the nonmagnetic intermediate layer forms the counter bias magnetic field.

As a preferred mode of the present invention, it is configured such that the nonmagnetic intermediate layer contains at least one selected from the group consisting of Cr, Ti, Mo, and W.

As a preferred mode of the present invention, it is configured such that the nonmagnetic intermediate layer has a thickness that inhibits the hard magnetic layer of the longitudinal bias magnetic field control layer and the soft magnetic layer from being ferromagnetically or antiferromagnetically coupled together.

As a preferred mode of the present invention, it is configured such that the soft magnetic layer has negative magnetostriction.

According to another aspect of the present invention, there is obtained a head gimbal assembly comprising a slider including the foregoing thin film magnetic head and disposed so as to confront a recording medium, and a suspension elastically supporting the slider.

According to another aspect of the present invention, there is obtained a hard disk drive comprising a slider including the foregoing thin film magnetic head and disposed so as to confront a disc-shaped recording medium driven to be rotated, and a positioning device supporting the slider and positioning the slider relative to the recording medium.

In the present invention, a longitudinal bias magnetic field control layer is provided for applying to a soft magnetic layer a counter bias magnetic field that is antiparallel (in opposite direction) to a longitudinal bias magnetic field. A magnitude of the counter bias magnetic field applied to the soft magnetic layer by the longitudinal bias magnetic field control layer is set smaller than that of the longitudinal bias magnetic field at a track center portion of the soft magnetic layer applied by a pair of bias magnetic field applying layers. Through subtraction between the longitudinal bias magnetic field and the counter bias magnetic field, a substantial longitudinal bias magnetic field is substantially applied to the soft magnetic layer in the same direction as that of the longitudinal bias magnetic field, and a magnitude of the substantial longitudinal bias magnetic field is maximum at both end portions of the soft magnetic layer and is weakened at the center portion of the soft magnetic layer. By reducing the magnitude of the longitudinal bias magnetic field applied to the soft magnetic layer at the track center portion thereof, sensitivity of the soft magnetic layer can be maintained or improved even if the reproduction track width is extremely narrowed.

DETAILED DESCRIPTION OF THE INVENTION

Now, specific embodiments of the present invention will be described in detail hereinbelow with reference to the drawings.

The gist of the present invention resides in a structure of a magneto-resistive effect element having a magneto-resistive effect film of a spin-valve film structure and incorporated in a reproducing head.

Figure 1:
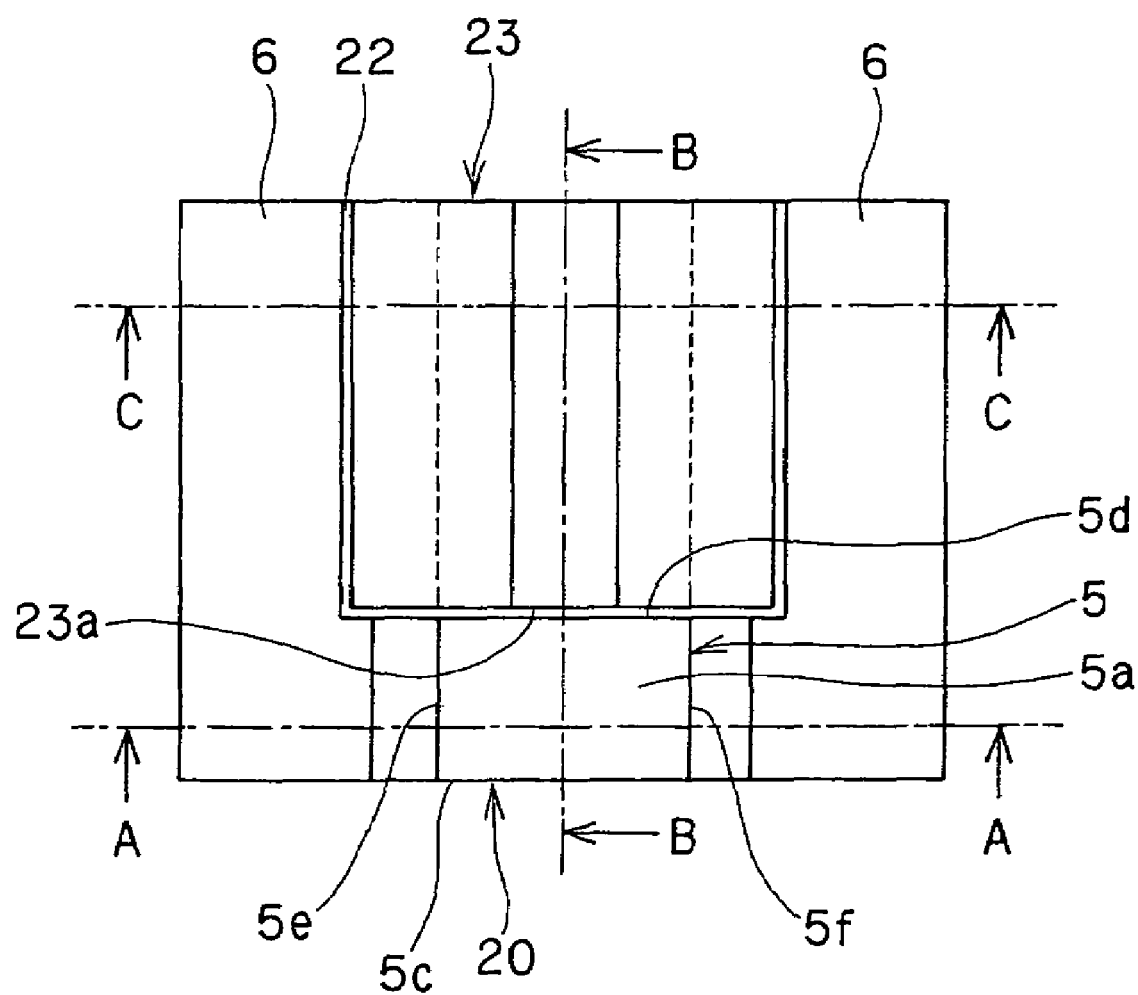
FIG. 1 is a plan view showing the main part of a reproducing head in an embodiment of the present invention.
Figure 2:
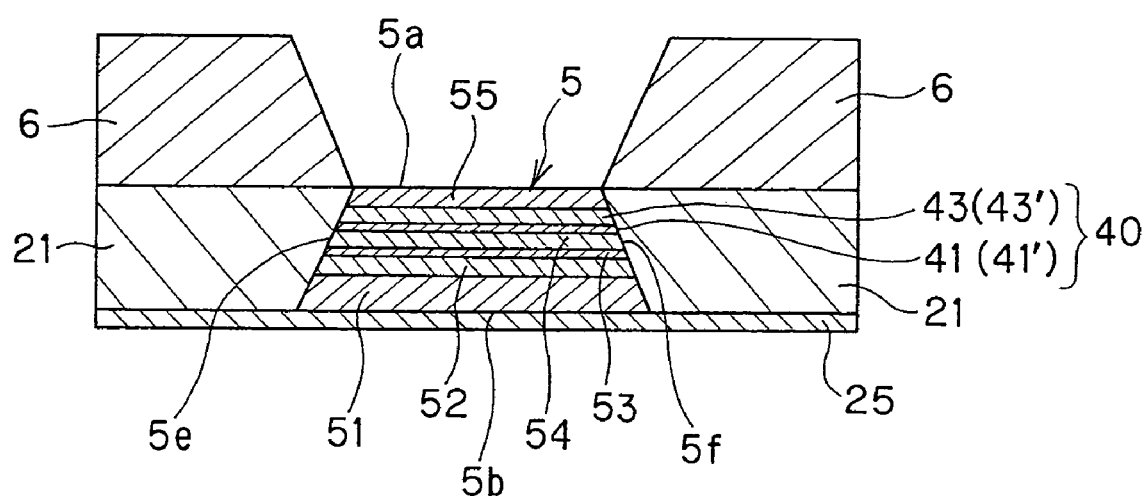
FIG. 2 is a sectional view taken along line A—A in FIG. 1.
Figure 3:
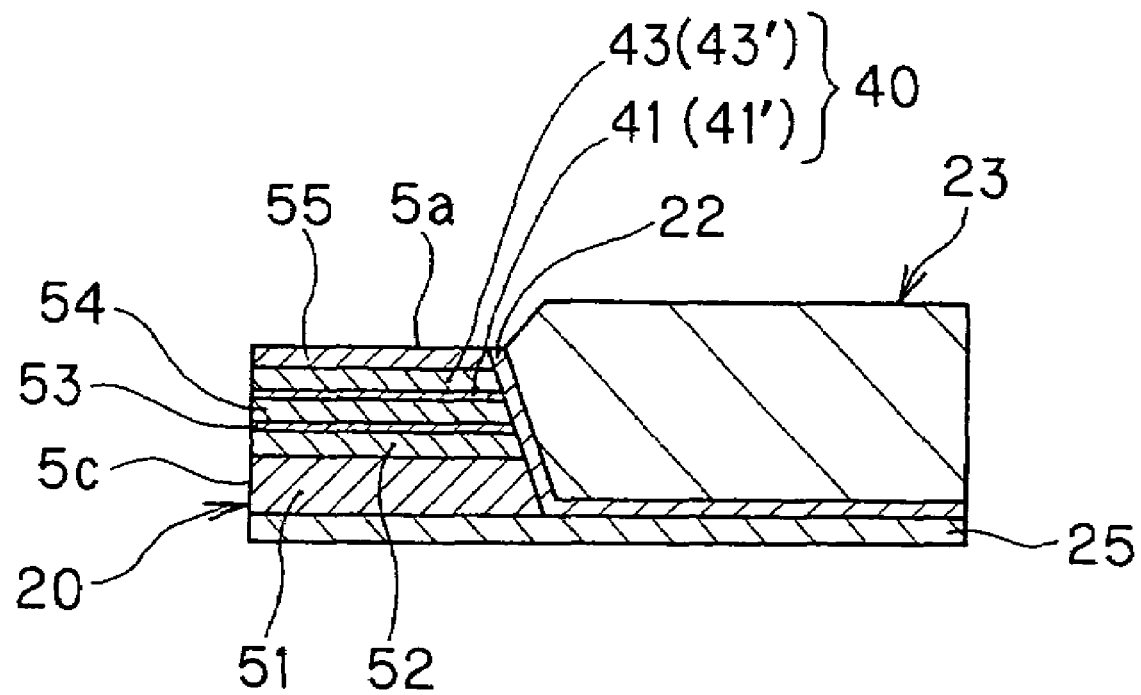
FIG. 3 is a sectional view taken along line B—B in FIG. 1.
Figure 4:
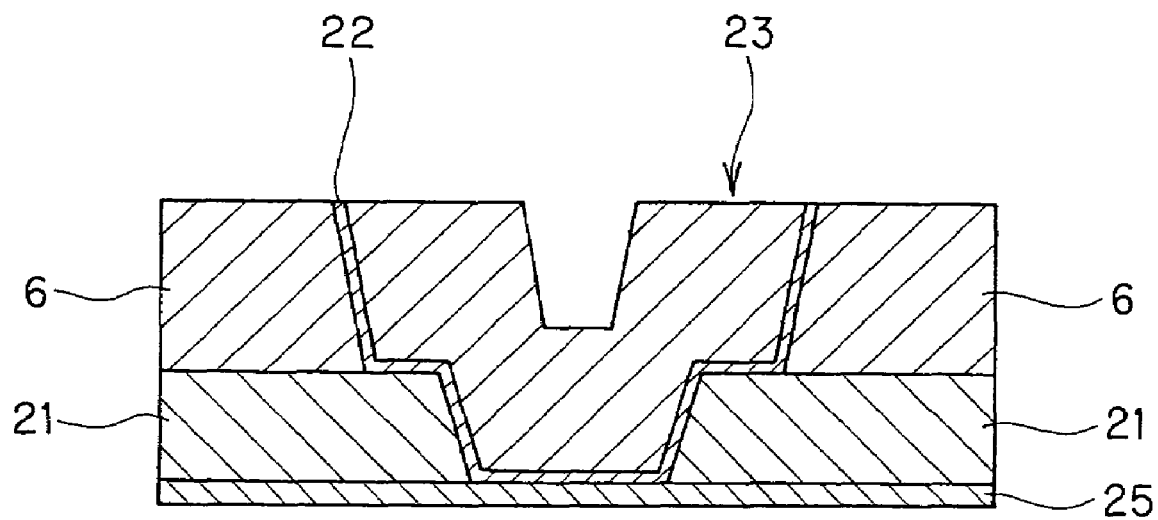
FIG. 4 is a sectional view taken along line C—C in FIG. 1.

FIG. 1 is a plan view showing the main part of a reproducing head in an embodiment of the present invention, FIG. 2 is a sectional view taken along line A—A in FIG. 1, FIG. 3 is a sectional view taken along line B—B in FIG. 1, and FIG. 4 is a sectional view taken along line C—C in FIG. 1.

As shown in FIG. 2, a magneto-resistive effect film forming a magneto-resistive effect element (MR element) 5 has a multilayer film structure comprising a nonmagnetic layer 53, a ferromagnetic layer 52 formed on one surface (in this embodiment, on the lower side in FIG. 2) of the nonmagnetic layer 53, a soft magnetic layer 54 formed on the other surface (in this embodiment, on the upper side in FIG. 2) of the nonmagnetic layer 53 and capable of acting to freely change a magnetization direction in response to an external magnetic field serving as magnetic information, and a pinning layer 51 formed so as to contact with one surface of the ferromagnetic layer 52 (a surface of the ferromagnetic layer 52 opposite to a surface thereof contacting with the nonmagnetic layer 53) for pinning a magnetization direction of the ferromagnetic layer 52. The illustrated preferred example is of a so-called pinning layer bottom type spin-valve film structure in which the pinning layer 51 is located on the bottom side.

More specifically, it is the structure in which the pinning layer 51, the ferromagnetic layer 52, the nonmagnetic layer 53, the soft magnetic layer 54, a longitudinal bias magnetic field control layer 40, and a protective layer 55 are stacked on an underlayer 25 in the order named. The ferromagnetic layer 52 is a layer of which the magnetization direction is fixed, and is normally formed by a ferromagnetic film. The ferromagnetic layer 52 is not limited to the structure of the single layer, but may be of a multilayer structure that acts like a ferromagnetic film. The pinning layer 51 is a layer for fixing the magnetization direction in the ferromagnetic layer 52, and is normally formed by an antiferromagnetic film. The nonmagnetic layer 53 is formed by, for example, a Cu film. The soft magnetic layer 54 is a layer of which a magnetization direction changes depending on a signal magnetic field from a recording medium, and is normally formed by a soft magnetic film. The soft magnetic layer 54 is not limited to the structure of the single layer, but may be of a multilayer structure that acts like a soft magnetic film.

As a material of the protective layer 55, Ta, for example, is used.

Then, as shown in FIG. 2, at both ends 5e and 5f of at least the soft magnetic layer 54 of the magneto-resistive effect film forming the magneto-resistive effect element (MR element) 5 in the present invention, a pair of bias magnetic field applying layers 21 and 21 are disposed, respectively, for applying a longitudinal bias magnetic field to the soft magnetic layer 54. On the bias magnetic field applying layers 21 and 21, two electrode layers 6 and 6 are formed for causing a sense current, being a current for magnetic signal detection, to flow through the MR element 5. Each bias magnetic field applying layer 21 is in the form of, for example, a permanent magnet or a stacked body of a ferromagnetic layer and an antiferromagnetic layer. Each electrode layer 6 is made of a conductive material such as Au.

In the magneto-resistive effect film of the present invention, the longitudinal bias magnetic field control layer 40 is further formed so as to contact with one surface of the soft magnetic layer 54 opposite to the other surface thereof contacting with the nonmagnetic layer 53.

This longitudinal bias magnetic field control layer 40 serves to apply to the soft magnetic layer 54 a counter bias magnetic field that is antiparallel (in opposite direction) to the foregoing longitudinal bias magnetic field. The magnitude of the counter bias magnetic field applied to the soft magnetic layer 54 by the longitudinal bias magnetic field control layer 40 is set smaller than that of the longitudinal bias magnetic field at a track center portion of the soft magnetic layer 54 which is applied by the foregoing pair of bias magnetic field applying layers 21 and 21.

The structure of the longitudinal bias magnetic field control layer 40 can be roughly divided into the following two structures, each of which will be described in detail hereinbelow.

(1) In Case where the Longitudinal Bias Magnetic Field Control Layer 40 is a Stacked Body of a Nonmagnetic Intermediate Layer 41 and an Antiferromagnetic Layer 43, and the Nonmagnetic Intermediate Layer 41 is Disposed so as to Contact with the Surface of the Soft Magnetic Layer 54

In this case, the longitudinal bias magnetic field control layer 40 (particularly the antiferromagnetic layer 43) is exchange-coupled to the soft magnetic layer 54 and a magnetic field due to exchange coupling therebetween forms the foregoing counter bias magnetic field. The nonmagnetic intermediate layer 41 in this case contains at least one selected from the group consisting of Cu, Ru, Au, Ir, Rh, and Cr. The nonmagnetic intermediate layer 41 is set to have a thickness that enables exchange coupling between the antiferromagnetic layer 43 and the soft magnetic layer 54. Specifically, taking into account the kind of metal of the nonmagnetic intermediate layer 41, the thickness is set to, for example, 1 nm or less, particularly 0.1 to 0.5 nm.

A material of the antiferromagnetic layer 43 is preferably an alloy of Mn and at least one selected from the group consisting of Ir, Rh, Ru, Pt, and Ni, or NiO, $Fe_2O_3$, CoO, or the like.

A relationship between the counter bias magnetic field applied to the soft magnetic layer 54 by the longitudinal bias magnetic field control layer 40 and the longitudinal bias magnetic field applied to the soft magnetic layer 54 by the pair of bias magnetic field applying layers 21 and 21 is such that, through subtraction between magnitudes of the mutually antiparallel magnetic fields, a substantial longitudinal bias magnetic field is substantially applied to the soft magnetic layer 54 in the same direction as that of the longitudinal bias magnetic field, and the magnitude thereof becomes maximum at both end portions of the soft magnetic layer 54 and is weakened at a center portion of the soft magnetic layer 54. More preferably, the magnitude is gradually weakened as approaching the center portion of the soft magnetic layer 54.

Further, taking into account the total stacking stress of the multilayer stacked body forming the whole thin film magnetic head, it is desirable that the soft magnetic layer 54 have negative magnetostriction. Specifically, when an ABS (Air Bearing Surface) is formed in an ABS processing process after a wafer process, the multilayer stacked body (MR film) forming the whole thin film magnetic head is subjected to a tensile stress in a height direction (in a depth direction further from the ABS), i.e. subjected to a compressive stress in a track width direction. Under such a stress condition, magnetization of the soft magnetic layer 54 is stabilized in the track width direction by forming the soft magnetic layer 54 of a negative magnetostrictive material because a soft magnetic film having negative magnetostriction has an axis of easy magnetization that is oriented in a direction of receiving a compressive stress. More specifically, it is desirable to use a soft magnetic layer having a magnetostriction constant of $-5\times10^{-5}$ to 0 (excluding zero). For example, $Ni_{85}Fe_{15}$, $CO_{80-85}Fe_{15-20}$, or the like can be cited.

Figure 5A:
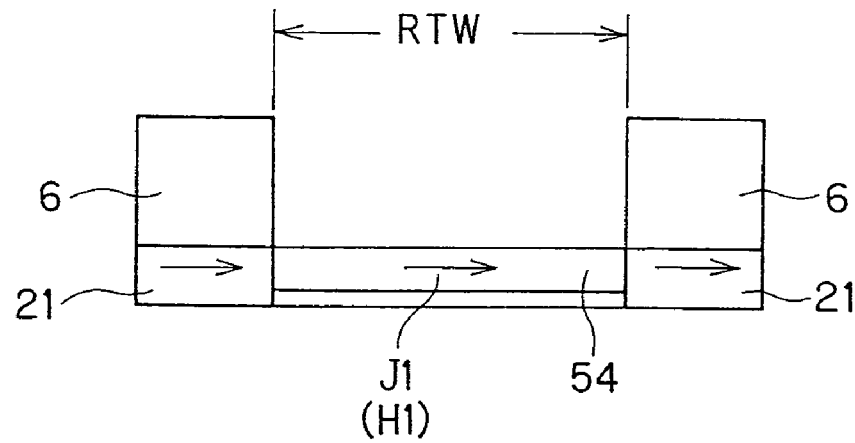
FIGS. 5A to 5C are conceptual diagrams for describing a bias operation of the present invention.
Figure 5B:
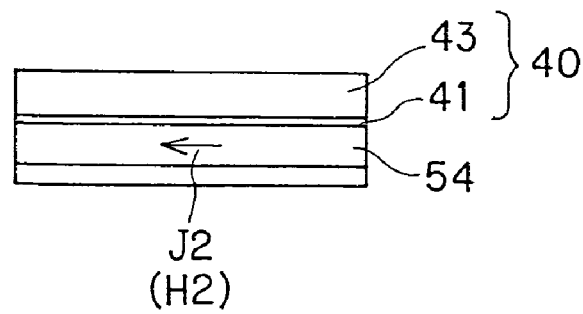
Figure 5C:
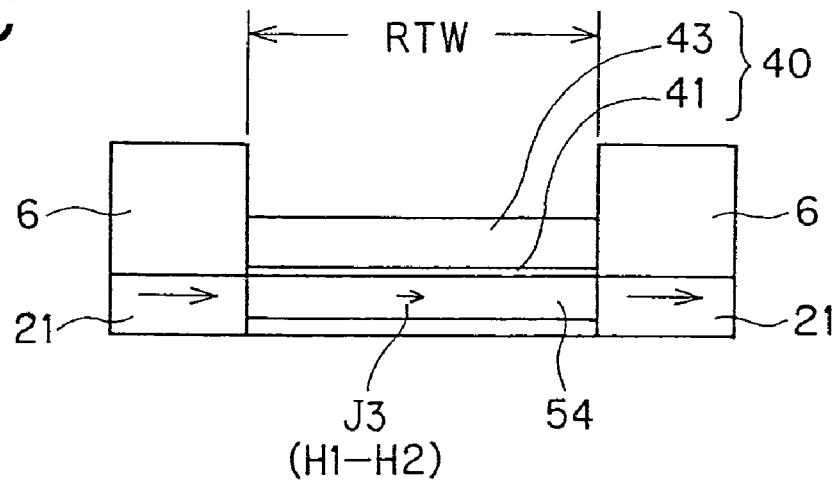

The foregoing phenomenon will be plainly described using operation conceptual diagrams of FIGS. 5A to 5C.

FIG. 5A is a conceptual diagram wherein a longitudinal bias magnetic field J1 is applied to the soft magnetic layer 54 by the pair of bias magnetic field applying layers 21 and 21 disposed at both ends of the soft magnetic layer 54. In this case, the bias magnetic field of a magnitude H1 is applied to the soft magnetic layer 54 in an arrow direction. To be precise, the magnitude of the bias magnetic field in this figure is not constant over the whole region of the soft magnetic layer 54, i.e. it becomes maximum at both end portions of the soft magnetic layer 54 and minimum at a center portion thereof. However, as a reproduction track width RTW decreases to cope with increasing recording density, a difference in magnitude between the bias magnetic fields at both end portions of the soft magnetic layer 54 and the center portion thereof minimizes. Therefore, the magnitude of the magnetic field at the center portion of the soft magnetic layer 54 is defined as H1 herein for convenience.

FIG. 5B is a conceptual diagram imaging the state where a counter bias magnetic field J2 is applied to the soft magnetic layer 54 by the longitudinal bias magnetic field control layer 40. A direction of the counter bias magnetic field J2 is set opposite (antiparallel) to a direction of the longitudinal bias magnetic field J1 shown in FIG. 5A, and further, a magnitude H2 of the counter bias magnetic field J2 is set smaller than the magnitude H1 of the longitudinal bias magnetic field J1 shown in FIG. 5A.

That is, in the present invention, it is set so that a relationship of H1–H2>0 is maintained at a driving temperature of the head. In FIG. 5B, it is assumed that the soft magnetic layer 54 is not affected by the longitudinal bias magnetic field caused by the pair of bias magnetic field applying layers 21 and 21.

FIG. 5C illustrates the state where the state of FIG. 5A and the state of FIG. 5B are combined together with the soft magnetic layer 54 commonly used, which corresponds to a state of a longitudinal bias magnetic field actually applied to the soft magnetic layer 54. Specifically, through subtraction between the magnitudes of the mutually antiparallel magnetic fields J1 and J2, the magnitude of a substantial longitudinal bias magnetic field J3 substantially applied to the soft magnetic layer 54 becomes H1–H2>0. Further, the direction of the substantial longitudinal bias magnetic field J3 is the same as that of the longitudinal bias magnetic field J1 shown in FIG. 5A. Moreover, the gradation in magnetic field is formed such that the magnitude of the substantial magnetic field becomes maximum at both end portions of the soft magnetic layer 54 while is gradually weakened as approaching the center portion of the soft magnetic layer 54.

Consequently, even if the reproduction track width RTW is narrowed, an ideal longitudinal bias is applied to the soft magnetic layer 54. That is, a large bias magnetic field is applied to the soft magnetic layer 54 at both end portions thereof, while the magnitude of the magnetic field is gradually damped as approaching the center portion of the soft magnetic layer 54 so that the minimum bias magnetic field is applied to the soft magnetic layer 54 at the center portion thereof. Note that the foregoing H1 is set in the range of 7900 to 15800 A/m (100 to 200 Oe), particularly preferably in the range of 7900 to 11850 A/m (100 to 150 Oe), the foregoing H2 is set in the range of 3950 to 11850 A/m (50 to 150 Oe), particularly preferably in the range of 3950 to 7900 A/m (50 to 100 Oe), and the foregoing H1–H2 is set in the range of 790 to 3950 A/m (10 to 50 Oe), particularly preferably in the range of 790 to 2370 A/m (10 to 30 Oe).

(2) In Case where the Longitudinal Bias Magnetic Field Control Layer 40 is a Stacked Body of a Nonmagnetic Intermediate Layer 41' and a Hard Magnetic Layer 43', and the Nonmagnetic Intermediate Layer 41' is Disposed so as to Contact with the Surface of the Soft Magnetic Layer 54

In this case, a magnetic field of the longitudinal bias magnetic field control layer 40 (particularly the hard magnetic layer 43') is applied to the soft magnetic layer 54 via the nonmagnetic intermediate layer 41' to form the foregoing counter bias magnetic field. As a material of the nonmagnetic intermediate layer 41' in this case, a selection is made of a material that can inhibit the hard magnetic layer 43' and the soft magnetic layer 54 from being ferromagnetically or antiferromagnetically coupled together. Further, the nonmagnetic intermediate layer 41' is set to have a thickness that can inhibit the hard magnetic layer 43' and the soft magnetic layer 54 from being ferromagnetically or antiferromagnetically coupled together.

Specifically, the material of the nonmagnetic intermediate layer 41' contains at least one selected from the group consisting of Cr, Ti, Mo, and W. On the other hand, the thickness of the nonmagnetic intermediate layer 41' is set to a value that can inhibit the hard magnetic layer 43' and the soft magnetic layer 54 from being ferromagnetically or antiferromagnetically coupled together, i.e. it is set to, for example, about 1 nm to 10 nm while taking into account the kind of metal of the nonmagnetic intermediate layer 41'.

A material of the hard magnetic layer (permanent magnet film) 43' is preferably CoPt, CoCrPt, or the like, but is not limited thereto.

A relationship between the counter bias magnetic field applied to the soft magnetic layer 54 by the longitudinal bias magnetic field control layer 40 and the longitudinal bias magnetic field applied to the soft magnetic layer 54 by the pair of bias magnetic field applying layers 21 and 21 is such that, through subtraction between magnitudes of the mutually antiparallel magnetic fields, a substantial longitudinal bias magnetic field is substantially applied to the soft magnetic layer 54 in the same direction as that of the longitudinal bias magnetic field, and the magnitude thereof becomes maximum at both end portions of the soft magnetic layer 54 and is weakened at a center portion of the soft magnetic layer 54. More preferably, the magnitude is gradually weakened as approaching the center portion of the soft magnetic layer 54.

As described before, taking into account the total stacking stress of the multilayer stacked body forming the whole thin film magnetic head, it is desirable that the soft magnetic layer 54 have negative magnetostriction. More specifically, it is desirable to use a soft magnetic layer having a magnetostriction constant of $-5\times10^{-5}$ to 0 (excluding zero). Examples of specific compositions are as described before.

Figure 6A:
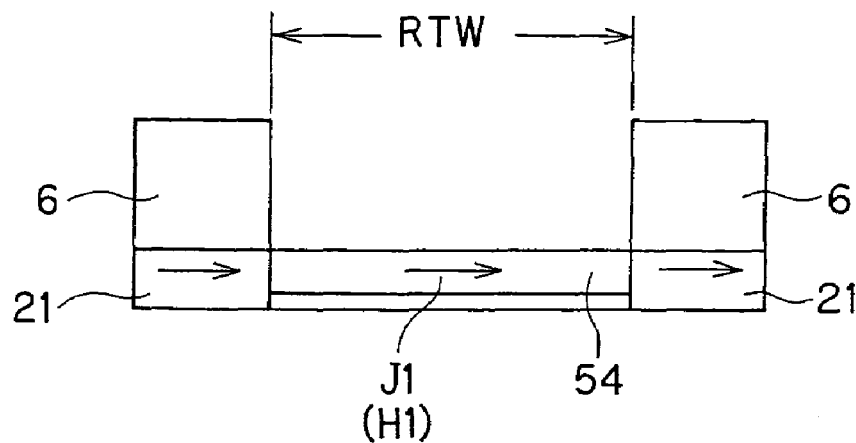
FIGS. 6A to 6C are conceptual diagrams for describing a bias operation of the present invention.
Figure 6B:
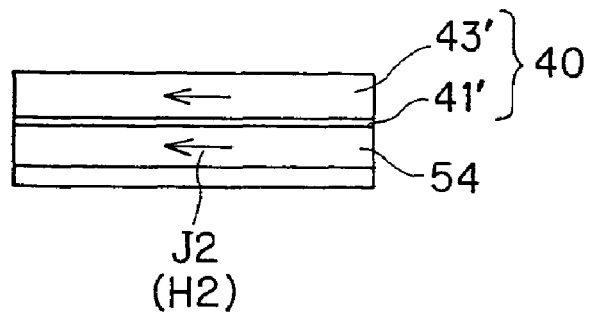
Figure 6C:
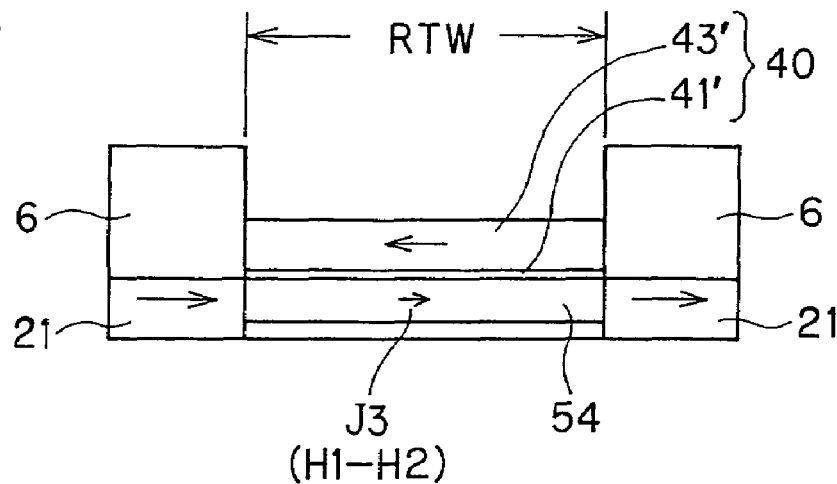

The foregoing phenomenon will be plainly described using operation conceptual diagrams of FIGS. 6A to 6C.

FIG. 6A is a conceptual diagram wherein a longitudinal bias magnetic field J1 is applied to the soft magnetic layer 54 by the pair of bias magnetic field applying layers 21 and 21 disposed at both ends of the soft magnetic layer 54, which is like FIG. 5A described before. In this case, the bias magnetic field of a magnitude H1 is applied to the soft magnetic layer 54 in an arrow direction. To be precise, the magnitude of the bias magnetic field is not constant over the whole region of the soft magnetic layer 54, i.e. it becomes maximum at both end portions of the soft magnetic layer 54 and minimum at a center portion thereof. However, as a reproduction track width RTW decreases to cope with increasing recording density, a difference in magnitude between the bias magnetic fields at both end portions of the soft magnetic layer 54 and the center portion thereof minimizes. Therefore, the magnitude of the magnetic field at the center portion of the soft magnetic layer 54 is defined as H1 herein for convenience.

FIG. 6B is a conceptual diagram imaging the state where a counter bias magnetic field J2 is applied to the soft magnetic layer 54 by the longitudinal bias magnetic field control layer 40. A direction of the counter bias magnetic field J2 is set opposite (antiparallel) to a direction of the longitudinal bias magnetic field J1 shown in FIG. 6A, and further, a magnitude H2 of the counter bias magnetic field J2 is set smaller than the magnitude H1 of the longitudinal bias magnetic field J1 shown in FIG. 6A. That is, in the present invention, it is set so that a relationship of H1−H2>0 is maintained at a driving temperature of the head.

In FIG. 6B, it is assumed that the soft magnetic layer 54 is not affected by the longitudinal bias magnetic field caused by the pair of bias magnetic field applying layers 21 and 21.

FIG. 6C illustrates the state where the state of FIG. 6A and the state of FIG. 6B are combined together with the soft magnetic layer 54 commonly used, which corresponds to a state of a longitudinal bias magnetic field actually applied to the soft magnetic layer 54. Specifically, through subtraction between the magnitudes of the mutually antiparallel magnetic fields J1 and J2, the magnitude of a substantial longitudinal bias magnetic field J3 substantially applied to the soft magnetic layer 54 becomes H1−H2>0. Further, the direction of the substantial longitudinal bias magnetic field J3 is the same as that of the longitudinal bias magnetic field J1 shown in FIG. 6A. Moreover, the gradation in magnetic field is formed such that the magnitude of the substantial magnetic field becomes maximum at both end portions of the soft magnetic layer 54 while is gradually weakened as approaching the center portion of the soft magnetic layer 54.

Consequently, even if the reproduction track width RTW is narrowed, an ideal longitudinal bias is applied to the soft magnetic layer 54. That is, a large bias magnetic field is applied to the soft magnetic layer 54 at both end portions thereof, while the magnitude of the magnetic field is gradually damped as approaching the center portion of the soft magnetic layer 54 so that the minimum bias magnetic field is applied to the soft magnetic layer 54 at the center portion thereof. Note that the foregoing H1 is set in the range of 7900 to 15800 A/m (100 to 200 Oe), particularly preferably in the range of 7900 to 11850 A/m (100 to 150 Oe), the foregoing H2 is set in the range of 3950 to 11850 A/m (50 to 150 Oe), particularly preferably in the range of 3950 to 7900 A/m (50 to 100 Oe), and the foregoing H1−H2 is set in the range of 790 to 3950 A/m (10 to 50 Oe), particularly preferably in the range of 790 to 2370 A/m (10 to 30 Oe).

Other Structural Portions of Reproducing Head

Supplementary description will be briefly made of the structure of the reproducing head illustrated in FIGS. 1 to 4.

In this embodiment illustrated in FIGS. 1 to 4, the reproducing head has a magnetic flux guide layer 23 disposed via an insulating layer 22 on a side of the MR element 5 opposite to its other side where an air bearing surface 20 is formed, for guiding a signal magnetic flux from a recording medium to the MR element 5. In the present invention, the magnetic flux guide layer 23 is not essential, i.e. the reproducing head may, of course, be of the type that is not provided with the magnetic flux guide layer 23.

The MR element 5 has two surfaces 5a and 5b facing opposite sides, an end portion 5c located at the air bearing surface 20, an end portion 5d on an opposite side relative to the end portion 5c, and two side portions 5e and 5f.

As described above, the bias magnetic field applying layers 21 and 21 are disposed so as to be adjacent to the side portions 5e and 5f of the MR element, respectively. The electrode layers 6 and 6 are disposed on the bias magnetic field applying layers 21 and 21 and, in a region where the bias magnetic field applying layers 21 and 21 are not formed, the electrode layers 6 and 6 are disposed on a later-described lower shield gap film.

The magnetic flux guide layer 23, which is formed as a preferred mode of the present invention, is disposed between the two bias magnetic field applying layers 21 and 21 and between the two electrode layers 6 and 6. As a material of the magnetic flux guide layer 23, use is preferably made of a soft magnetic material excellent in soft magnetic property.

In FIGS. 2 to 4, it is illustrated that the MR element 5, the bias magnetic field applying layers 21 and 21, and the insulating layer 22 are disposed on the underlayer 25. The underlayer 25 is disposed on the later-described lower shield gap film. As a material of the underlayer 25, Ta or NiCr, for example, is used. Note that the MR element 5, the bias magnetic field applying layers 21 and 21, and the insulating layer 22 may be disposed on the lower shield gap film without providing the underlayer 25.

Modification of Magneto-Resistive Effect Element

The multilayer film structure of the magneto-resistive effect element in the present invention is not limited to the foregoing so-called pinning layer bottom type spin-valve film structure in which the pinning layer 51 is located on the bottom side as shown in FIG. 2, and various modifications thereof may be made possible.

Figure 7:
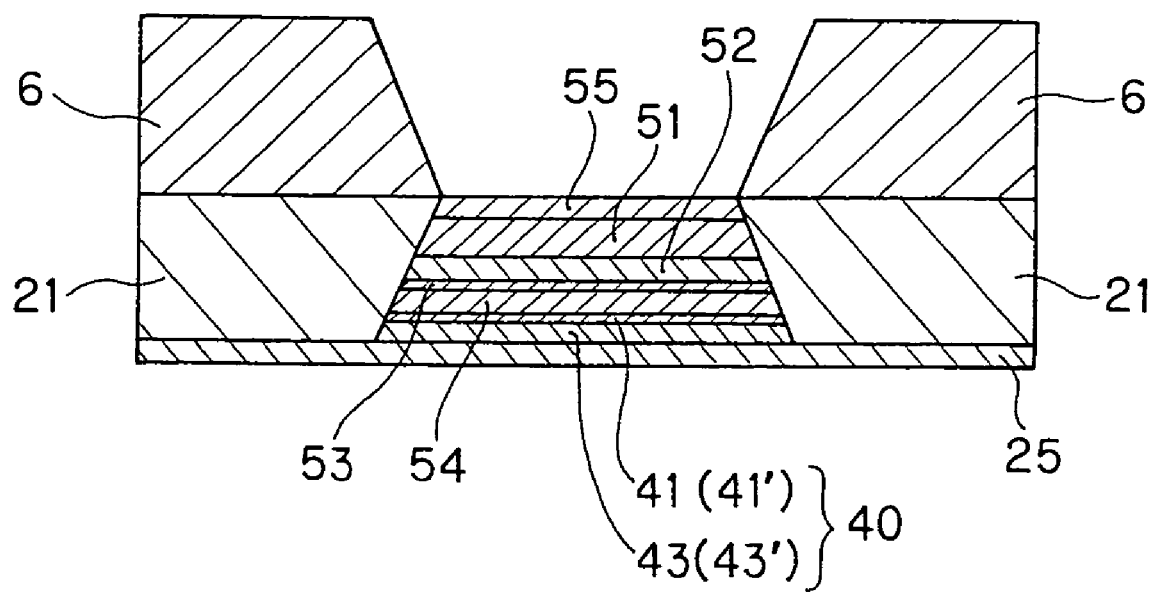
FIG. 7 is a sectional view for describing a so-called pinning layer top type spin-valve film structure wherein a pinning layer is disposed on the top side.

For example, as shown in FIG. 7, it may be a so-called pinning layer top type spin-valve film structure wherein the pinning layer 51 is disposed on the top side. Specifically, as shown in FIG. 7, it may be the structure in which the longitudinal bias magnetic field control layer 40 (combination of the nonmagnetic intermediate layer 41 and the antiferromagnetic layer 43 or combination of the nonmagnetic intermediate layer 41' and the hard magnetic layer 43'), the soft magnetic layer 54, the nonmagnetic layer 53, the ferromagnetic layer 52, the pinning layer 51, and the protective layer 55 may be stacked on the underlayer 25 in the order named.

Figure 8:
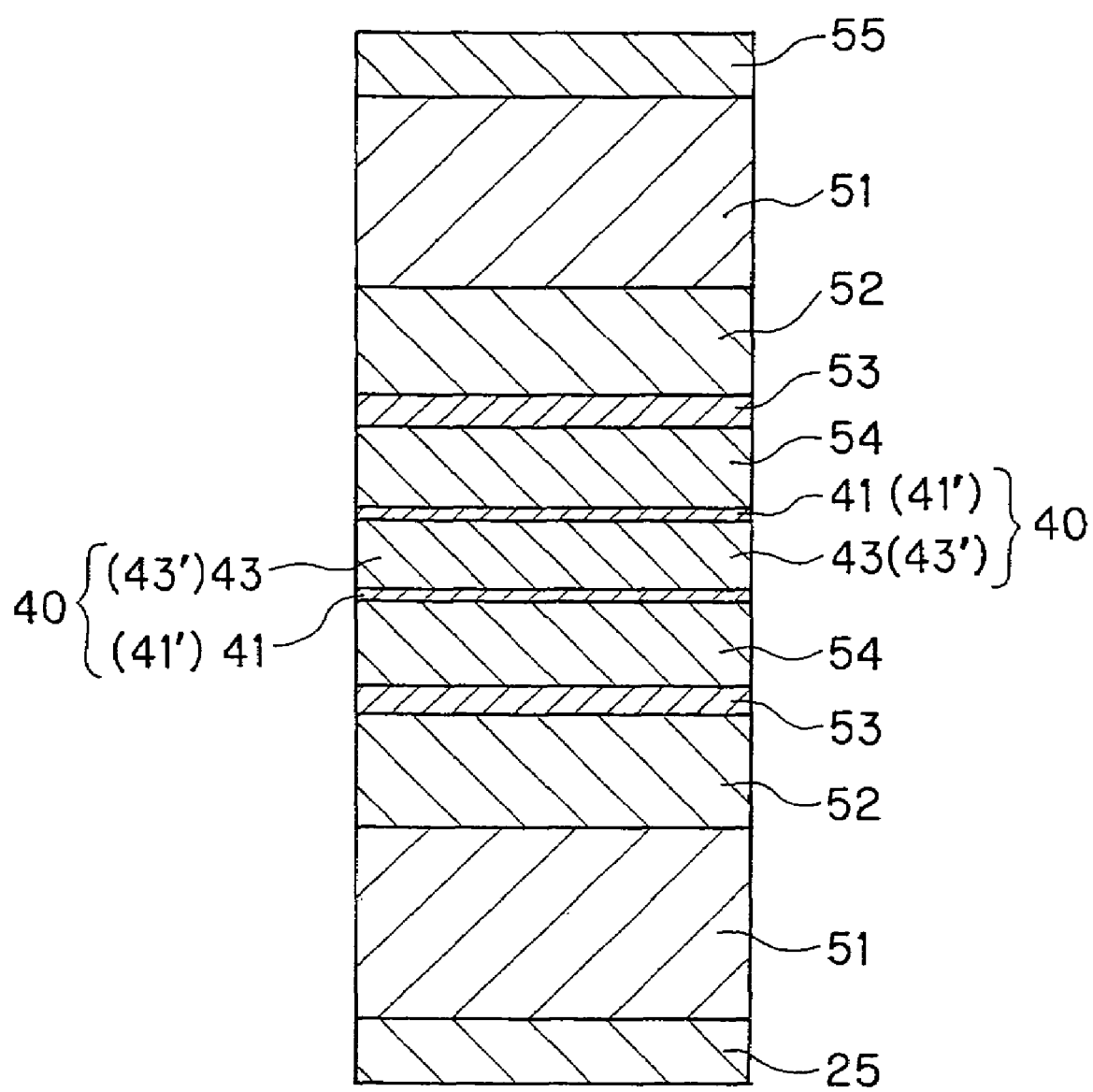
FIG. 8 is a sectional view for describing a spin-valve film structure of a so-called dual-type stacked film structure having two magnetism sensitive portions.

Further, as shown in FIG. 8, for example, it may also be a so-called dual-type stacked film structure having two magnetism sensitive portions. The same reference symbols in FIGS. 7 and 8 represent the same members.

In the present invention, the term "a magneto-resistive effect element" is not limited to the foregoing spin-valve film structure, but widely includes such an element that exhibits a magneto-resistive effect, for example, a TMR element using a tunnel-type magneto-resistive effect, or a CPP (Current Perpendicular to Plane)-GMR element.

Overall Structure of Thin Film Magnetic Head

Figure 9:
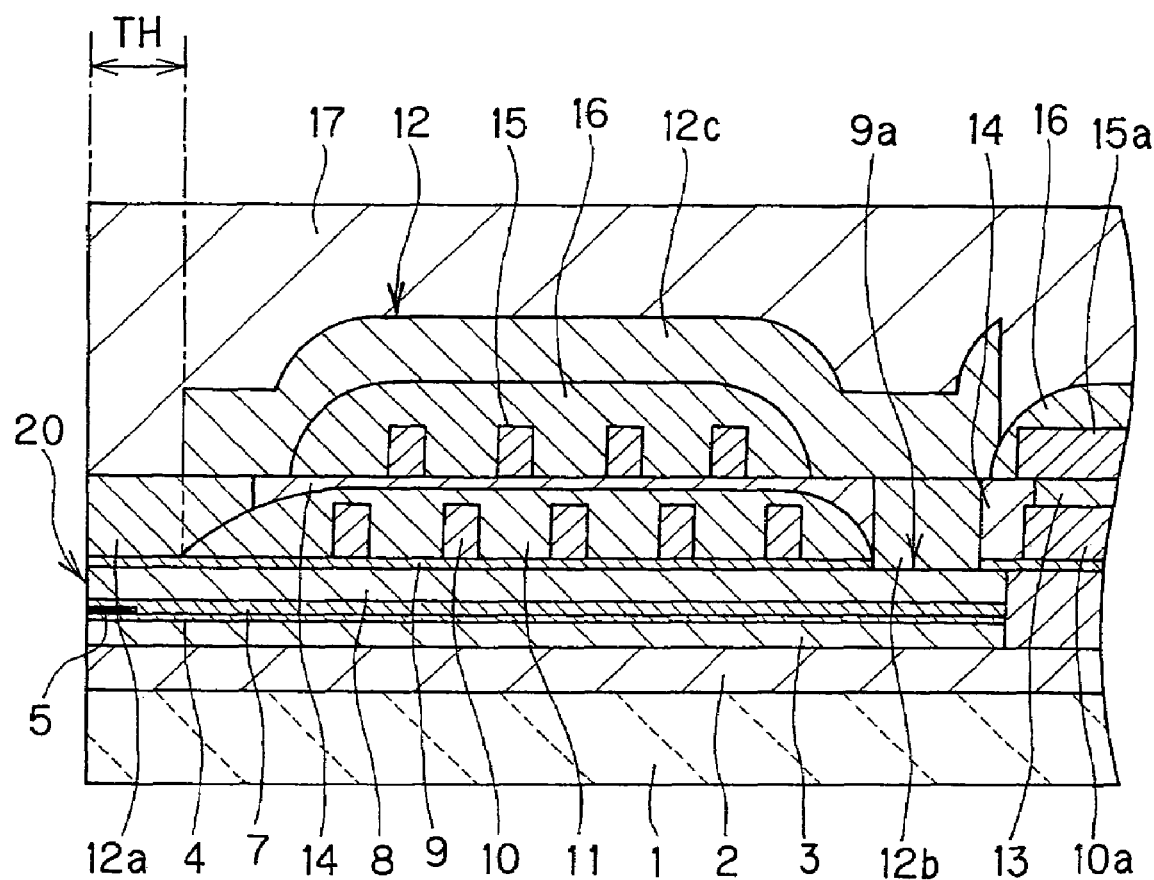
FIG. 9 is a diagram for describing a structure of a thin film magnetic head according to a preferred embodiment of the present invention, which shows a section of the thin film magnetic head perpendicular to an air bearing surface and a substrate.
Figure 10:
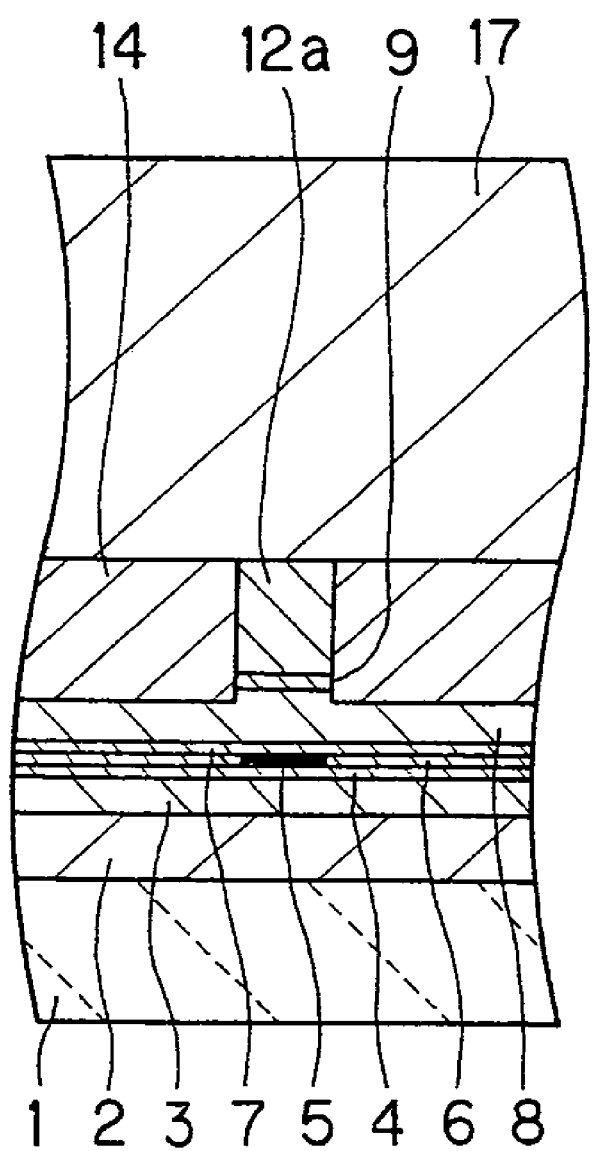
FIG. 10 is a diagram for describing a structure of the thin film magnetic head according to the preferred embodiment of the present invention, which shows a section of a magnetic pole portion of the thin film magnetic head parallel to the air bearing surface.

Now, description will be made of the overall structure of a thin film magnetic head having the foregoing magneto-resistive effect element. FIGS. 9 and 10 are diagrams for describing the structure of the thin film magnetic head according to a preferred embodiment of the present invention, wherein FIG. 9 shows a section of the thin film magnetic head perpendicular to an air bearing surface and a substrate, and FIG. 10 shows a section of a magnetic pole portion of the thin film magnetic head parallel to the air bearing surface. Herein, the air bearing surface represents a confronting surface of the thin film magnetic head confronting a magnetic recording medium.

It is expected that the overall structure of the thin film magnetic head can be easily understood by description along production processes thereof. To this end, the overall structure of the thin film magnetic head will be described hereinbelow on the basis of the production processes.

First, an insulating layer 2 made of an insulating material such as alumina ($Al_2O_3$) or silicon dioxide ($SiO_2$) is formed on a substrate 1 made of a ceramic material such as altic ($Al_2O_3.TiC$) by sputtering or the like. The thickness of the insulting layer 2 is set to, for example, about 0.5 to 20 µm.

Then, on the insulating layer 2 is formed a lower shield layer 3 for a reproducing head, made of a magnetic material. The thickness thereof is set to, for example, about 0.1 to 5 µm. As the magnetic material of the lower shield layer 3, there can be cited, for example, FeAlSi, NiFe, CoFe, CoFeNi, FeN, FeZrN, FeTaN, CoZrNb, or CoZrTa. The lower shield layer 3 is formed by sputtering, plating, or the like.

Then, a lower shield gap film 4 made of an insulating material such as $Al_2O_3$ or $SiO_2$ is formed on the lower shield layer 3 by sputtering or the like. The thickness thereof is set to, for example, about 10 to 200 nm.

Then, the magneto-resistive effect film for reproduction including the foregoing longitudinal bias magnetic field control layer 40, the bias magnetic field applying layers 21 and 21, and the electrode layers 6 and 6, which are not illustrated, are formed on the lower shield gap film 4 for forming the magneto-resistive effect element (MR element) 5.

Then, an upper shield gap film 7 made of an insulating material such as alumina is formed in a thickness of, for example, 10 to 200 nm on the MR element 5 and the lower shield gap film 4 by sputtering or the like.

Then, an upper shield layer 8 of the reproducing head made of a magnetic material and serving also as a lower magnetic pole layer of a recording head is formed in a thickness of, for example, about 3 to 4 µm on the upper shield gap film 7. The magnetic material of the upper shield layer 8 may be the same as that of the foregoing lower shield layer 3. The upper shield layer 8 is formed by sputtering, plating, or the like.

Incidentally, the upper shield layer 8 may be replaced with an upper shield layer, a separation layer made of a nonmagnetic material such as alumina and formed on the upper shield layer by sputtering or the like, and a lower magnetic pole layer formed on the separation layer. This is an example of the structure wherein functions of a magnetic pole and a shield are not achieved by one layer, but achieved by separate layers.

Then, a recording gap layer 9 made of an insulating material such as alumina is formed in a thickness of, for example, 50 to 300 nm on the upper shield layer 8 by sputtering or the like.

Then, the recording gap layer 9 is partly etched to form a contact hole 9a at a central portion of a later-described thin film coil for forming a magnetic circuit.

Then, a first layer portion 10 of the thin film coil made of, for example, copper (Cu) is formed in a thickness of, for example, 2 to 3 µm on the recording gap layer 9. In FIG. 9, symbol 10a denotes a connecting portion of the first layer portion 10 that is connected to a later-described second layer portion 15 of the thin film coil. The first layer portion 10 is wound around the contact hole 9a.

Then, an insulating layer 11, such as a photoresist, made of an organic material having fluidity upon heating is formed into a predetermined pattern so as to cover the first layer portion 10 of the thin film coil and the recording gap layer 9 in a peripheral region thereof.

Then, a heat treatment is carried out at a predetermined temperature for flattening the surface of the insulating layer 11. By this heat treatment, respective edge portions on the outer periphery and inner periphery of the insulating layer 11 are formed into a rounded slope shape.

Then, in a region from a slope portion of the insulating layer 11 on the side of the later-described air bearing surface 20 over the side of the air bearing surface 20, a track width regulating layer 12a of an upper magnetic pole layer 12 is formed on the recording gap layer 9 and the insulating layer 11 using a magnetic material for the recording head. The upper magnetic pole layer 12 comprises the track width regulating layer 12a, a later-described coupling portion layer 12b, and a later-described yoke portion layer 12c.

The track width regulating layer 12a has a tip portion formed on the recording gap layer 9 and serving as a magnetic pole portion of the upper magnetic pole layer 12, and a connecting portion formed on the slope portion of the insulating layer 11 on the side of the air bearing surface 20 and connected to the yoke portion layer 12c. The width of the tip portion is set equal to a recording track width. The width of the connecting portion is set larger than the width of the tip portion.

Upon forming the track width regulating layer 12a, the coupling portion layer 12b made of a magnetic material is simultaneously formed on the contact hole 9a, and further, a connection layer 13 made of a magnetic material is simultaneously formed on the connecting portion 10a. The coupling portion layer 12b constitutes a portion of the upper magnetic pole layer 12, which is magnetically coupled to the upper shield layer 8.

Then, magnetic pole trimming is carried out. Specifically, in a peripheral region of the track width regulating layer 12a, at least part of the recording gap layer 9 and a magnetic pole portion of the upper shield layer 8 on the side of the recording gap layer 9 is etched using the track width regulating layer 12a as a mask. Thereby, as shown in FIG.

10, a trim structure is formed wherein respective widths of at least part of the magnetic pole portion of the upper magnetic pole layer 12, the recording gap layer 9, and the magnetic pole portion of the upper shield layer 8 are made even. According to this trim structure, it is possible to prevent the increase in effective track width which is caused by spreading of magnetic flux in the neighborhood of the recording gap layer 9.

Then, an insulating layer 14 made of an inorganic insulating material such as alumina is formed over the whole in a thickness of, for example, 3 to 4 μm.

Then, the insulating layer 14 is polished by, for example, chemical mechanical polishing to the surfaces of the track width regulating layer 12a, the coupling portion layer 12b, and the connection layer 13, to thereby carry out flattening.

Then, on the flattened insulating layer 14, the second layer portion 15 of the thin film coil made of, for example, copper (Cu) is formed in a thickness of, for example, 2 to 3 μm. In FIG. 9, symbol 15a denotes a connecting portion of the second layer portion 15, which is connected to the connecting portion 10a of the first layer portion 10 of the thin film coil via the connection layer 13. The second layer portion 15 is wound around the coupling portion layer 12b.

Then, an insulating layer 16, such as a photoresist, made of an organic material having fluidity upon heating is formed into a predetermined pattern so as to cover the second layer portion 15 of the thin film coil and the insulating layer 14 in a peripheral region thereof.

Then, a heat treatment is carried out at a predetermined temperature for flattening the surface of the insulating layer 16. By this heat treatment, respective edge portions on the outer periphery and inner periphery of the insulating layer 16 are formed into a rounded slope shape.

Then, the yoke portion layer 12c forming a yoke portion of the upper magnetic pole layer 12 is formed on the track width regulating layer 12a, the insulating layers 14 and 16, and the coupling portion layer 12b, using a magnetic material for the recording head such as Permalloy. An end portion of the yoke portion layer 12c on the side of the air bearing surface 20 is located at a position apart from the air bearing surface 20. The yoke portion layer 12c is connected to the upper shield layer 8 via the coupling portion layer 12b.

Then, an overcoat layer 17 made of, for example, alumina is formed so as to cover the whole. Finally, mechanical processing is applied to a slider including the foregoing respective layers to form the air bearing surface 20 of the thin film magnetic head including the recording head and the reproducing head, so that the thin film magnetic head is completed.

The thin film magnetic head thus produced comprises the confronting surface (air bearing surface 20) confronting the recording medium, the reproducing head, and the recording head (induction-type electromagnetic transducer element). The reproducing head comprises the MR element 5, and the lower shield layer 3 and the upper shield layer 8 for shielding the MR element 5. The lower shield layer 3 and the upper shield layer 8 have portions on the side of the air bearing surface 20, which are disposed to confront each other with the MR element 5 sandwiched therebetween.

The recording head includes the magnetic pole portions confronting each other on the side of the air bearing surface 20, and comprises the lower magnetic pole layer (upper shield layer 8) and the upper magnetic pole layer 12 magnetically coupled to each other, the recording gap layer 9 provided between the magnetic pole portion of the lower magnetic pole layer and the magnetic pole portion of the upper magnetic pole layer 12, and the thin film coil 10, 15 of which at least part is disposed between the lower magnetic pole layer and the upper magnetic pole layer 12 in an insulated manner against them. In this thin film magnetic head, as shown in FIG. 9, the length from the air bearing surface 20 to an end of the insulating layer 11 on the side of the air bearing surface 20 becomes a throat height (identified by symbol TH in FIG. 9). The throat height represents a length (height) from the air bearing surface 20 to a position where an interval between the two magnetic pole layers starts to increase.

Operation of Thin Film Magnetic Head

Now, description will be made of an operation of the thin film magnetic head according to this embodiment. The thin film magnetic head records information on the recording medium using the recording head, while reproduces information recorded on the recording medium using the reproducing head.

In the reproducing head, through subtraction between a longitudinal bias magnetic field applied by the bias magnetic field applying layers 21 and 21 and a counter bias magnetic field applied by the longitudinal bias magnetic field control layer 40, a direction of a substantial longitudinal bias magnetic field substantially applied to the soft magnetic layer 54 is perpendicular to a direction that is perpendicular to the air bearing surface 20. In the MR element 5, a magnetization direction of the soft magnetic layer 54 is set to the direction of the bias magnetic field in the state where no signal magnetic field exists. On the other hand, a magnetization direction of the ferromagnetic layer 52 is fixed to the direction perpendicular to the air bearing surface 20.

In the MR element 5, the magnetization direction of the soft magnetic layer 54 changes depending on a signal magnetic field from the recording medium, so that a relative angle between the magnetization direction of the soft magnetic layer 54 and the magnetization direction of the ferromagnetic layer 52 changes, and consequently, a resistance value of the MR element 5 changes. The resistance value of the MR element 5 can be derived from a potential difference between the two electrode layers 6 and 6 when a sense current is caused to flow through the MR element 5 by the two electrode layers 6 and 6. In this manner, the information recorded on the recording medium can be reproduced by the reproducing head.

Head Gimbal Assembly and Hard Disk Drive

Hereinbelow, description will be made of a head gimbal assembly and a hard disk drive according to an embodiment of the present invention.

Figure 11:
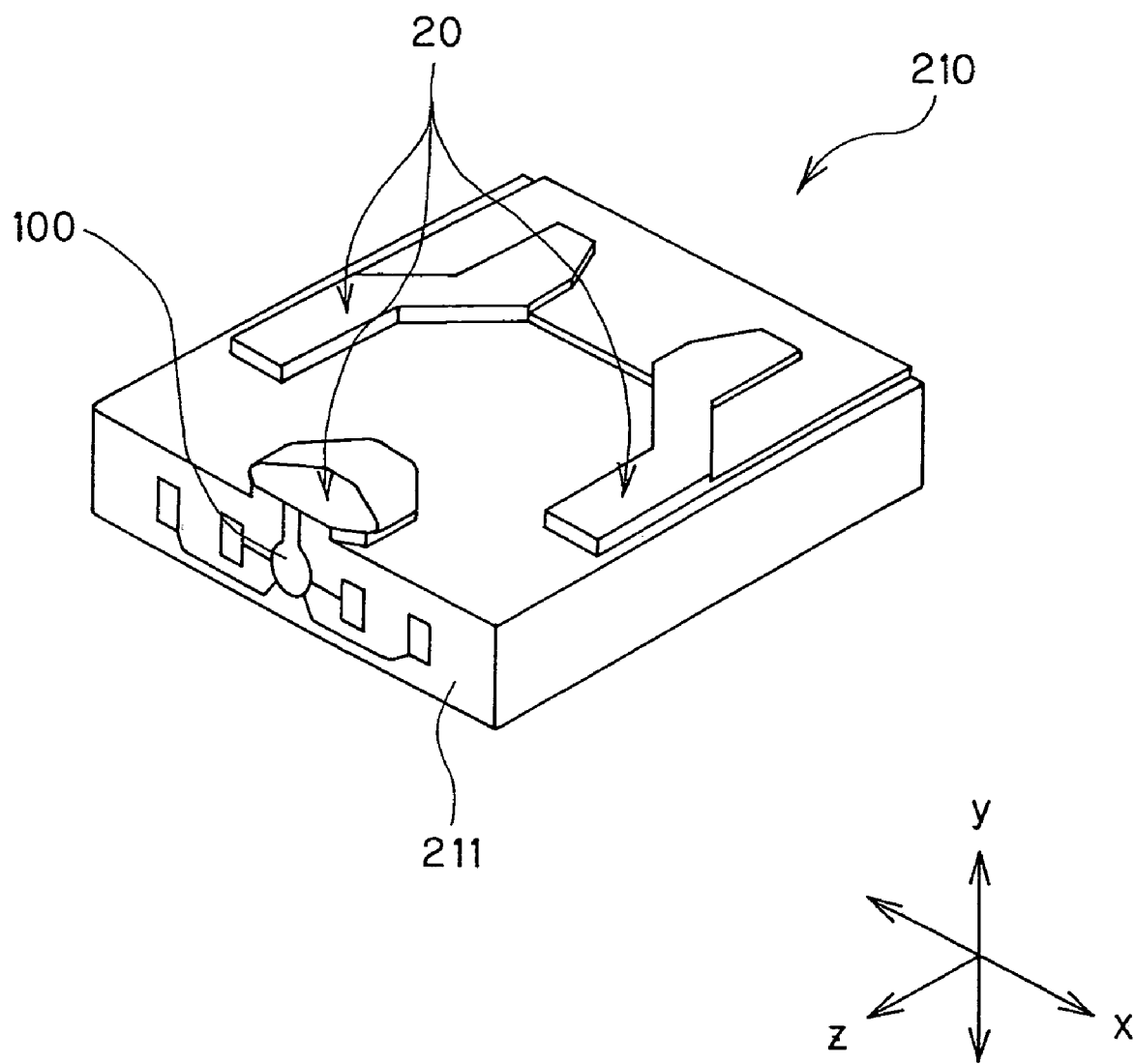
FIG. 11 is a perspective view showing a slider included in a head gimbal assembly in an embodiment of the present invention.

Referring first to FIG. 11, a slider 210 included in the head gimbal assembly will be described. In the hard disk drive, the slider 210 is disposed so as to confront a hard disk serving as a disc-shaped recording medium and driven to be rotated. The slider 210 comprises a base body 211 mainly composed of the substrate 1 and the overcoat layer 17 in FIG. 9.

The base body 211 has a generally hexahedral shape. One surface, among six surfaces, of the base body 211 is arranged to confront the hard disk. This one surface is formed with the air bearing surface 20.

When the hard disk is rotated in a z-direction in FIG. 11, lift is generated below the slider 210 in a y-direction in FIG. 11 because of an air flow passing between the hard disk and the slider 210. This lift causes the slider 210 to rise from the surface of the hard disk. Incidentally, an x-direction in FIG. 11 represents a track traverse direction of the hard disk.

A thin film magnetic head 100 according to this embodiment is formed in the neighborhood of an end portion (lower-left end portion in FIG. 11) of the slider 210 on an air exit side thereof.

Figure 12:
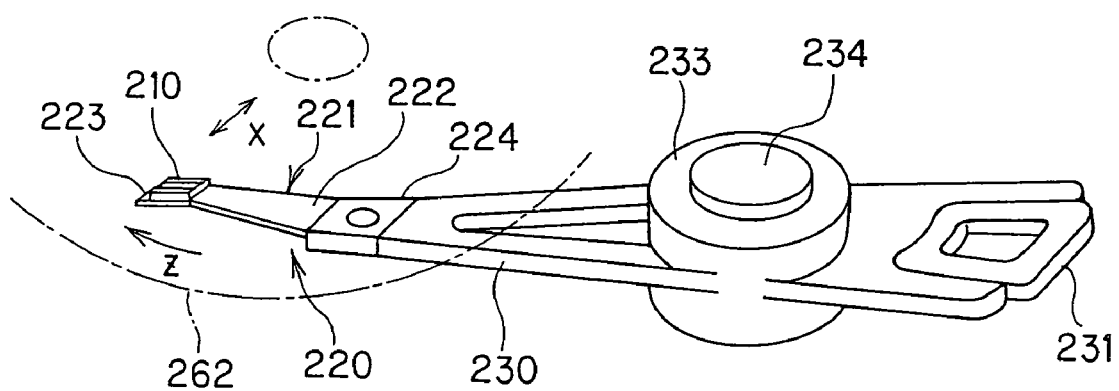
FIG. 12 is a perspective view showing a head arm assembly including the head gimbal assembly in the embodiment of the present invention.

Referring now to FIG. 12, description will be made of a head gimbal assembly 220 according to this embodiment. The head gimbal assembly 220 comprises the slider 210, and a suspension 221 elastically supporting the slider 210. The suspension 221 comprises a load beam 222 in the form of a blade spring made of, for example, stainless steel, a flexure 223 provided at one end of the load beam 222 and joined with the slider for giving a suitable degree of freedom to the slider 210, and a base plate 224 provided at the other end of the load beam 222.

The base plate 224 is adapted to be attached to an arm 230 of an actuator for moving the slider 210 in the track traverse direction x of a hard disk 262. The actuator comprises the arm 230 and a voice coil motor for driving the arm 230. In the flexure 223, a portion where the slider 210 is mounted, is provided with a gimbal portion for keeping constant a posture of the slider 210.

The head gimbal assembly 220 is attached to the arm 230 of the actuator. An assembly in which the head gimbal assembly 220 is attached to one arm 230 is called a head arm assembly. On the other hand, an assembly in which a carriage has a plurality of arms and the head gimbal assembly 220 is attached to each of the arms is called a head stack assembly.

FIG. 12 shows one example of the head arm assembly. In this head arm assembly, the head gimbal assembly 220 is attached to one end of the arm 230. To the other end of the arm 230 is attached a coil 231 forming part of the voice coil motor. At an intermediate portion of the arm 230 is provided a bearing portion 233 that is mounted on a shaft 234 for pivotally supporting the arm 230.

Figure 13:
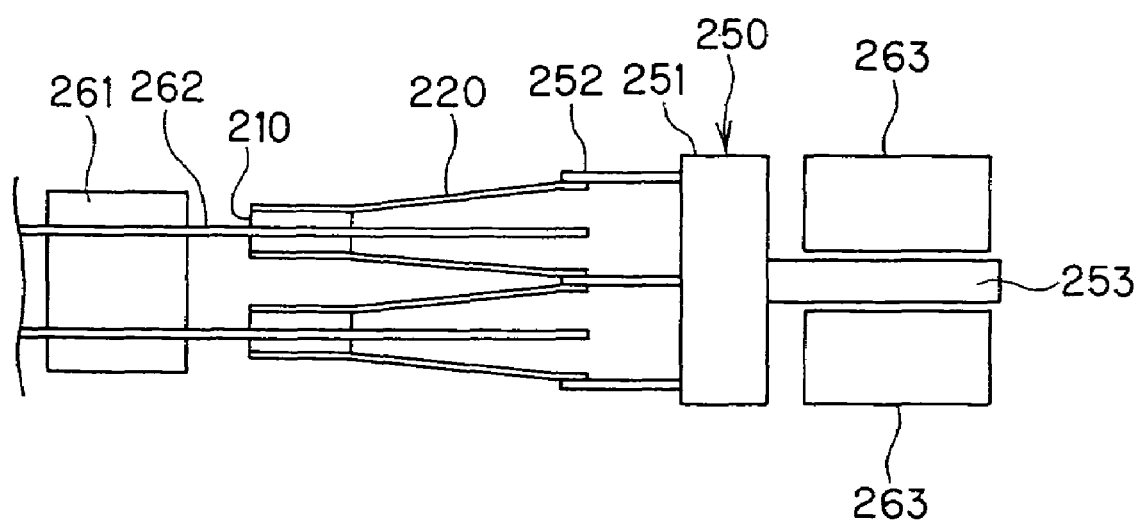
FIG. 13 is an explanatory diagram showing the main part of a hard disk drive in the embodiment of the present invention.
Figure 14:
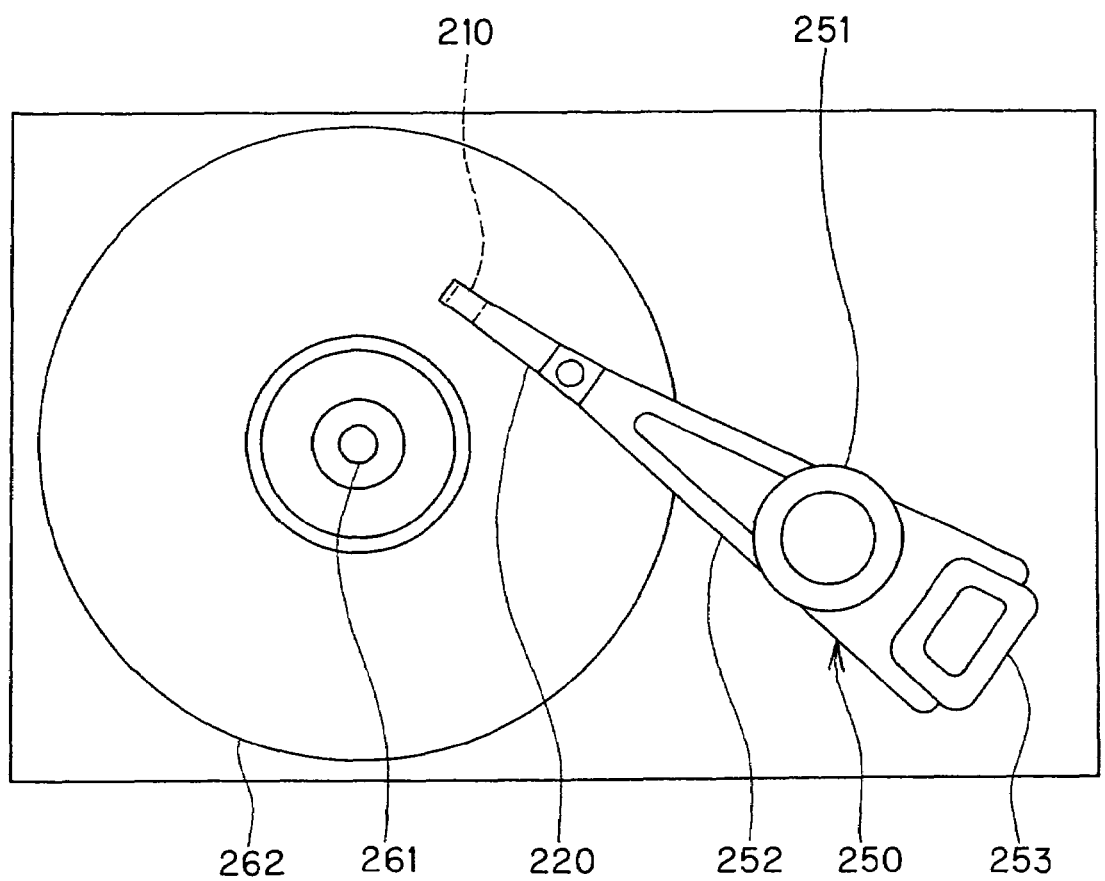
FIG. 14 is a plan view of the hard disk drive in the embodiment of the present invention.

Referring now to FIGS. 13 and 14, description will be made of one example of the head stack assembly and the hard disk drive according to this embodiment.

FIG. 13 is an explanatory diagram showing the main part of the hard disk drive, while FIG. 14 is a plan view of the hard disk drive.

A head stack assembly 250 comprises a carriage 251 having a plurality of arms 252. A plurality of head gimbal assemblies 220 are attached to the arms 252 so as to be adjacent to each other in the vertical direction with an interval therebetween. A coil 253 forming part of a voice coil motor is attached to the carriage 251 on the opposite side relative to the arms 252. The head stack assembly 250 is incorporated into the hard disk drive.

The hard disk drive has a plurality of hard disks 262 mounted on a spindle motor 261. Two sliders 210 are disposed for each of the hard disks 262 so as to confront each other with the hard disk 262 interposed therebetween. The voice coil motor has permanent magnets 263 that are disposed at positions to confront each other with the coil 253 interposed therebetween.

The head stack assembly 250 excluding the sliders 210 and the actuator correspond to a positioning device in the present invention and serve to support the sliders 210 and to position the sliders 210 relative to the hard disks 262.

In the hard disk drive according to this embodiment, the sliders 210 are moved in the track traverse direction of the hard disks 262 and positioned relative to the hard disks 262 by the use of the actuator. The thin film magnetic head included in the slider 210 records information on the hard disk 262 using the recording head, while reproduces information recorded on the hard disk 262 using the reproducing head.

The head gimbal assembly and the hard disk drive according to this embodiment achieve the effect like that achieved by the thin film magnetic head according to the foregoing embodiment.

The description has been made of the thin film magnetic head having the structure wherein the reproducing head is formed on the side of the substrate, then the recording head is stacked thereon. However, this stacking order may be reversed. Further, when used only for reading, the thin film magnetic head may be configured to have only the reproducing head.

The invention of the thin film magnetic head as described above will be described in further detail with reference to specific examples shown below.

EXAMPLE 1

Preparation was made of a reproducing head sample having a pinning layer bottom type spin-valve magneto-resistive effect element in which a pinning layer 51 was located at the bottom as shown in FIG. 2. Hereinbelow, only the main part of implementation will be described.

As shown in FIG. 9, a lower shield layer 3 of NiFe was formed, then a lower shield gap film 4 of $Al_2O_3$ was formed thereon, and then a stacked film constituting a magneto-resistive effect element was formed thereon. Specifically, on the lower shield gap film 4 of $Al_2O_3$ was formed the stacked film composed of an underlayer 25 (NiCr; thickness 5 nm), a pinning layer 51 (PtMn antiferromagnetic layer; thickness 20 nm), a ferromagnetic layer 52 (ferromagnetic layer formed by a three-layer stacked body of CoFe (thickness 1.5 nm)/Ru (thickness 0.8 nm)/CoFe (thickness 2 nm)), a nonmagnetic layer 53 (Cu; thickness 2 nm), a soft magnetic layer 54 (soft magnetic layer formed by a two-layer stacked body of CoFe (thickness 1 nm)/NiFe (thickness 3 nm)), a longitudinal bias magnetic field control layer 40 (Cu (thickness 0.2 nm)/IrMn (antiferromagnetic layer; thickness 5 nm)), and a protective layer 55 (Ta; thickness 2 Å).

Fixation of a magnetization direction of the ferromagnetic layer 52 by the pinning layer 51 was carried out in a vacuum by a heat treatment wherein a temperature was 300° C., an applied magnetic field was 790 kA/m (10 kOe), and a treatment time was 5 hours.

Further, in order to form a counter bias magnetic field, exchange coupling between the soft magnetic layer 54 and the IrMn antiferromagnetic layer was carried out in a vacuum by a heat treatment wherein a temperature was 250° C., an applied magnetic field was 39500 A/m (500 Oe), and a treatment time was 2 hours. As a result, a magnitude H2 of the obtained counter bias magnetic field was 7900 A/m (100 Oe).

After respectively performing the heat treatment for fixing the magnetization direction of the ferromagnetic layer 52 and the heat treatment for forming the counter bias magnetic field applied to the soft magnetic layer 54, a mask was formed on the magneto-resistive effect film for defining a shape of the MR element by etching. This mask was formed by patterning a resist layer made of two organic films to have a shape with an undercut to make a bottom surface smaller than an upper surface.

The magneto-resistive effect film was selectively subjected to dry etching such as ion milling by the use of the mask to thereby obtain a patterned magneto-resistive effect element. Then, after etching portions of the magneto-resistive effect element where bias magnetic field applying layers 21 and 21 should be disposed, the bias magnetic field applying layers 21 and 21 (CoCrPt; thickness 30 nm for each) were formed on the underlayer 25. Then, electrode layers 6 and 6 (Au; thickness 40 nm for each) were formed on the bias magnetic field applying layers 21 and 21.

The reproduction track width RTW was set to 120 nm.

The bias magnetic field applying layers 21 and 21 were magnetized under the magnetization condition at room temperature in a magnetic field of 158 kA/m (2 kOe) for 60 seconds to thereby apply a longitudinal bias magnetic field to the soft magnetic layer 54. A magnitude H1 of the magnetic field applied to the soft magnetic layer 54 at a center portion thereof only by the bias magnetic field applying layers 21 and 21 was set to 11850 A/m (150 Oe). As a result, a substantial longitudinal bias magnetic field H1–H2 was 3950 A/m (50 Oe).

On such an MR element were formed an upper shield gap layer of Al$_2$O$_3$ and an upper shield layer of NiFe to thereby prepare a reproducing head sample of Example 1.

EXAMPLE 2

The longitudinal bias magnetic field control layer 40 of the reproducing head sample of Example 1 was changed in structure to a two-layer stacked body of a nonmagnetic intermediate layer of Cr (thickness 5 nm) and a hard magnetic layer of CoPt (thickness 5 nm). The direction of a magnetic field applied to the soft magnetic layer 54 by the longitudinal bias magnetic field control layer 40 changed in structure was set antiparallel to that of the longitudinal bias magnetic field and the magnitude thereof was set smaller than that of the longitudinal bias magnetic field at the track center portion of the soft magnetic layer 54.

The CoPt hard magnetic layer (thickness 5 nm) was magnetized under the magnetization condition at room temperature in a magnetic field of 395 kA/m (5 kOe) for 60 seconds. A magnitude H2 of the resultantly obtained counter bias magnetic field was 7900 A/m (100 Oe).

The other processing was the same as that in Example 1 to thereby prepare a reproducing head sample of Example 2. As a result, a substantial longitudinal bias magnetic field H1–H2 was 3950 A/m (50 Oe).

COMPARATIVE EXAMPLE 1

In the reproducing head sample of Example 1, the longitudinal bias magnetic field control layer 40 was not formed. The other processing was the same as that in Example 1 to thereby prepare a reproducing head sample of Comparative Example 1.

COMPARATIVE EXAMPLE 2

In the reproducing head sample of Example 2, the structure of the two-layer stacked body of the nonmagnetic intermediate layer of Cr (thickness 5 nm) and the hard magnetic layer of CoPt (thickness 5 nm) was changed to a structure of a two-layer stacked body of a nonmagnetic intermediate layer of Ru (thickness 2 nm) and a hard magnetic layer of CoPt (thickness 5 nm). Then, a reproducing head sample of Comparative Example 2 was prepared by ferromagnetically coupling the hard magnetic layer and the soft magnetic layer together so that a bias was applied in a direction to assist the magnetization of the soft magnetic layer caused by the longitudinal bias magnetic field, further in the same direction. As a result, the magnitude of a substantial longitudinal bias magnetic field in Comparative Example 2 was 15800 A/m (200 Oe), which was the sum of H1=11850 A/m (150 Oe) and the assist bias of 3950 A/m (50 Oe). Incidentally, Comparative Example 2 corresponds to the conventional technique disclosed in the foregoing JP-A-2001-297412.

COMPARATIVE EXAMPLE 3

In the reproducing head sample of Example 2, the structure of the two-layer stacked body of the nonmagnetic intermediate layer of Cr (thickness 5 nm) and the hard magnetic layer of CoPt (thickness 5 nm) was changed to a structure of a two-layer stacked body of a nonmagnetic intermediate layer of Ru (thickness 0.8 nm) and a hard magnetic layer of CoPt (thickness 5 nm). Then, a reproducing head sample of Comparative Example 3 was prepared by antiferromagnetically coupling the hard magnetic layer and the soft magnetic layer together so that a bias was applied in a direction to assist the magnetization of the soft magnetic layer caused by the longitudinal bias magnetic field, further in the same direction. As a result, the magnitude of a substantial longitudinal bias magnetic field in Comparative Example 3 was 19750 A/m (250 Oe), which was the sum of H1=11850 A/m (150 Oe) and the assist bias of 7900 A/m (100 Oe). Incidentally, Comparative Example 3 corresponds to the conventional technique disclosed in the foregoing JP-A-2001-297412.

Using the reproducing head samples of Examples 1 and 2 of the present invention and the reproducing head samples of Comparative Examples 1 to 3, (1) Normalized Reproduction Output (mV/μm), (2) Reproduction Output Change Rate (%), and (3) Barkhausen Noise Occurrence Rate (%) were derived in the following manner.

(1) Normalized Reproduction Output (mV/μm)

An output was measured using a measurement current of 3 mA, and a normalized reproduction output (mV/μm) was derived by dividing a value of the output by a reproduction track width. The reproduction track width was 120 nm common to all the samples.

(2) Reproduction Output Change Rate (%)

Reproduction was repeated 1000 times, and the reproduction output change rate (%) was derived from the following expression (1).

$$\frac{\text{Maximum Output Value} - \text{Minimum Output Value}}{\text{Average Output Value}} \times 100 \qquad (1)$$

(3) Barkhausen Noise Occurrence Rate (%)

The Barkhausen noise occurrence rate (%) was defined as a rate of the number of times of detection of noise when reproduction was repeated 1000 times.

These results are shown in Table 1 below.

TABLE 1

| | Normalized Reproduction Output (mV/μm) | Reproduction Output Change Rate (%) | Barkhausen Noise Occurrence Rate (%) |
|---|---|---|---|
| Example 1 | 7.5 | 0.2 | 4.0 |
| Example 2 | 7.3 | 0.2 | 4.5 |
| Comparative Example 1 | 5.0 | 0.3 | 6.5 |

TABLE 1-continued

|  | Normalized Reproduction Output (mV/μm) | Reproduction Output Change Rate (%) | Barkhausen Noise Occurrence Rate (%) |
|---|---|---|---|
| Comparative Example 2 | 5.0 | 0.2 | 5.0 |
| Comparative Example 3 | 4.9 | 0.2 | 5.1 |

From the results shown in Table 1, it is understood that the reproduction output can be increased without impairing the stability thereof according to the present invention.

The effect of the present invention is obvious from the foregoing results. Specifically, a thin film magnetic head of the present invention comprises a magneto-resistive effect element having a magneto-resistive effect film, wherein the magneto-resistive effect film is a multilayer film comprising a nonmagnetic layer, a ferromagnetic layer formed on one surface of the nonmagnetic layer, a soft magnetic layer formed on the other surface of the nonmagnetic layer, and a pinning layer formed so as to contact with one surface of the ferromagnetic layer (a surface of the ferromagnetic layer opposite to the other surface thereof contacting with the nonmagnetic layer) for pinning a magnetization direction of the ferromagnetic layer, wherein, at both ends of at least the soft magnetic layer of the magneto-resistive effect film, a pair of bias magnetic field applying layers are disposed for applying a longitudinal bias magnetic field to the soft magnetic layer, wherein a longitudinal bias magnetic field control layer is formed so as to contact with a surface of the soft magnetic layer opposite to the other surface thereof contacting with the nonmagnetic layer, the longitudinal bias magnetic field control layer acting to apply to the soft magnetic layer a counter bias magnetic field that is antiparallel (in opposite direction) to the longitudinal bias magnetic field, and wherein a magnitude of the counter bias magnetic field applied to the soft magnetic layer by the longitudinal bias magnetic field control layer is set smaller than that of the longitudinal bias magnetic field at a track center portion of the soft magnetic layer applied by the pair of bias magnetic field applying layers. Therefore, the thin film magnetic head of the present invention not only ensures the stable reproduction performance, but also improves sensitivity of the soft magnetic layer at the track center portion thereof to thereby improve the reproduction output. This effect becomes more outstanding as the reproduction track width decreases in order to cope with the increasing recording density.

This patent application claims priority from Japanese patent applications, No. 2003-172916 filed on Jun. 18, 2003, and No. 2004-082437 filed on Mar. 22, 2004, in the Japan Patent Office, the entire contents of each of which are incorporated by reference herein.

What is claimed is:

1. A thin film magnetic head, comprising:
    a magneto-resistive effect element having a magneto-resistive effect film, said magneto-resistive effect film is a multilayer film including,
        a nonmagnetic layer,
        a ferromagnetic layer formed on one surface of said nonmagnetic layer,
        a soft magnetic layer formed on the other surface of said nonmagnetic layer,
        a pinning layer, formed in contact with a surface of said ferromagnetic layer opposite to the other surface thereof contacting said nonmagnetic layer, configured to pin a magnetization direction of said ferromagnetic layer, and
        a longitudinal bias magnetic field control layer, formed in contact with a surface of said soft magnetic layer opposite to the other surface thereof contacting said nonmagnetic layer, the longitudinal bias magnetic field control layer configured to apply to said soft magnetic layer a counter bias magnetic field that is antiparallel to a longitudinal bias magnetic field; and
    a pair of bias magnetic field applying layers, disposed at both ends of at least said soft magnetic layer of said magneto-resistive effect film, configured to apply the longitudinal bias magnetic field to said soft magnetic layer,
    wherein a magnitude of said counter bias magnetic field applied to said soft magnetic layer by said longitudinal bias magnetic field control layer is set smaller than that of said longitudinal bias magnetic field at a track center portion of said soft magnetic layer applied by said pair of bias magnetic field applying layers.

2. The thin film magnetic head according to claim 1, wherein, through subtraction between said longitudinal bias magnetic field and said counter bias magnetic field, a substantial longitudinal bias magnetic field is substantially applied to said soft magnetic layer in the same direction as that of said longitudinal bias magnetic field, and a magnitude of said substantial longitudinal bias magnetic field is maximum at both end portions of said soft magnetic layer and is weakened at the center portion of said soft magnetic layer.

3. The thin film magnetic head according to claim 1, wherein said longitudinal bias magnetic field control layer includes a nonmagnetic intermediate layer and an antiferromagnetic layer, said nonmagnetic intermediate layer is disposed in contact with the surface of said soft magnetic layer, said longitudinal bias magnetic field control layer is exchange-coupled to said soft magnetic layer, and a magnetic field due to exchange coupling therebetween forms said counter bias magnetic field.

4. The thin film magnetic head according to claim 3, wherein said nonmagnetic intermediate layer contains at least one material selected from the group consisting of Cu, Ru, Au, Ir, Rh, and Cr.

5. The thin film magnetic head according to claim 3, wherein said nonmagnetic intermediate layer has a thickness that enables exchange coupling between said antiferromagnetic layer of said longitudinal bias magnetic field control layer and said soft magnetic layer.

6. The thin film magnetic head according to claim 1, wherein said longitudinal bias magnetic field control layer includes a nonmagnetic intermediate layer and a hard magnetic layer, said nonmagnetic intermediate layer is disposed in contact with the surface of said soft magnetic layer, and a magnetic field applied to said soft magnetic layer by said hard magnetic layer via said nonmagnetic intermediate layer forms said counter bias magnetic field.

7. The thin film magnetic head according to claim 6, wherein said nonmagnetic intermediate layer contains at least one material selected from the group consisting of Cr, Ti, Mo, and W.

8. The thin film magnetic head according to claim 6, wherein said nonmagnetic intermediate layer has a thickness that inhibits said hard magnetic layer of said longitudinal bias magnetic field control layer and said soft magnetic layer from being ferromagnetically or antiferromagnetically coupled together.

9. The thin film magnetic head according to claim 1, wherein said soft magnetic layer has negative magnetostriction.

10. A head gimbal assembly, comprising:
a slider, including a thin film magnetic head, disposed to confront a recording medium; and
a suspension configured to elastically support said slider, wherein
said thin film magnetic head includes a magneto-resistive effect element having a magneto-resistive effect film,
said magneto-resistive effect film is a multilayer film including a nonmagnetic layer, a ferromagnetic layer formed on one surface of said nonmagnetic layer, a soft magnetic layer formed on the other surface of said nonmagnetic layer, and a pinning layer formed in contact with a surface of said ferromagnetic layer opposite to the other surface thereof contacting said nonmagnetic layer configured to pin a magnetization direction of said ferromagnetic layer,
a pair of bias magnetic field applying layers are disposed at both ends of at least said soft magnetic layer of said magneto-resistive effect film, configured to apply a longitudinal bias magnetic field to said soft magnetic layer,
a longitudinal bias magnetic field control layer is formed in contact with a surface of said soft magnetic layer opposite to the other surface thereof contacting said nonmagnetic layer, said longitudinal bias magnetic field control layer is configured to apply to said soft magnetic layer a counter bias magnetic field that is antiparallel to said longitudinal bias magnetic field, and
a magnitude of said counter bias magnetic field applied to said soft magnetic layer by said longitudinal bias magnetic field control layer is set smaller than that of said longitudinal bias magnetic field at a track center portion of said soft magnetic layer applied by said pair of bias magnetic field applying layers.

11. A hard disk drive, comprising:
a slider, including a thin film magnetic head, disposed to confront a disc-shaped recording medium configured to be rotatably driven; and
a positioning device configured to support said slider and position said slider relative to said recording medium, wherein
said thin film magnetic head includes a magneto-resistive effect element having a magneto-resistive effect film,
said magneto-resistive effect film is a multilayer film including a nonmagnetic layer, a ferromagnetic layer formed on one surface of said nonmagnetic layer, a soft magnetic layer formed on the other surface of said nonmagnetic layer, and a pinning layer formed in contact with a surface of said ferromagnetic layer opposite to the other surface thereof contacting said nonmagnetic layer configured to pin a magnetization direction of said ferromagnetic layer,
a pair of bias magnetic field applying layers are disposed at both ends of at least said soft magnetic layer of said magneto-resistive effect film, configured to apply a longitudinal bias magnetic field to said soft magnetic layer,
a longitudinal bias magnetic field control layer is formed in contact with a surface of said soft magnetic layer opposite to the other surface thereof contacting said nonmagnetic layer, said longitudinal bias magnetic field control layer is configured to apply to said soft magnetic layer a counter bias magnetic field that is antiparallel to said longitudinal bias magnetic field, and
a magnitude of said counter bias magnetic field applied to said soft magnetic layer by said longitudinal bias magnetic field control layer is set smaller than that of said longitudinal bias magnetic field at a track center portion of said soft magnetic layer applied by said pair of bias magnetic field applying layers.

* * * * *